(12) United States Patent
Nakayama (10) Patent No.: US 9,195,897 B2
(45) Date of Patent: Nov. 24, 2015

(54) MEDIA PROCESSING DEVICE, MEDIA PROCESSING SYSTEM, AND CONTROL METHOD OF A MEDIA PROCESSING DEVICE

(71) Applicant: Seiko Epson Corporation, Tokyo (JP)

(72) Inventor: Satoru Nakayama, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/461,923

(22) Filed: Aug. 18, 2014

(65) Prior Publication Data

US 2015/0053756 A1 Feb. 26, 2015

(30) Foreign Application Priority Data

Aug. 26, 2013 (JP) .................................. 2013-174279

(51) Int. Cl.
*G06F 17/00* (2006.01)
*G06K 9/18* (2006.01)

(52) U.S. Cl.
CPC ...................................... *G06K 9/186* (2013.01)

(58) Field of Classification Search
CPC ............................... G07F 19/00; G07F 19/202
USPC .................................. 235/375, 379, 380, 385
See application file for complete search history.

(56) References Cited

U.S. PATENT DOCUMENTS

| 2012/0224202 A1* | 9/2012 | Ito et al. ....................... 358/1.12 |
| 2012/0300253 A1* | 11/2012 | Omori .......................... 358/1.15 |
| 2015/0213348 A1* | 7/2015 | Ito et al. ....................... 235/379 |

FOREIGN PATENT DOCUMENTS

| JP | 11-314426 | 11/1999 |
| JP | 11-316732 | 11/1999 |
| JP | 2004-206362 | 7/2004 |
| JP | 2008-152761 | 7/2008 |

* cited by examiner

*Primary Examiner* — Daniel St Cyr (57) ABSTRACT

A media processing device 1 has an MICR reader 17 that reads magnetic ink characters recorded on a check; an interface 32 that communicates with a web browser; and a control unit 30 that controls the MICR reader 17 to read magnetic ink characters recorded on the check based on control data received from the web browser, and sends data based on the read result of the MICR reader 17 to the web browser.

12 Claims, 5 Drawing Sheets

- PORT NUMBER OF DESTINATION
- RESPONSE REQUEST COMMAND C1
- POSITIVE ACKNOWLEDGEMENT COMMAND C2
- READ INSTRUCTION COMMAND C3
- DISCHARGE INSTRUCTION COMMAND C4

FIG. 5

MEDIA PROCESSING DEVICE, MEDIA PROCESSING SYSTEM, AND CONTROL METHOD OF A MEDIA PROCESSING DEVICE

Priority is claimed under 35 U.S.C. §119 to Japanese Application no. 2013-174279 filed on Aug. 26, 2013 which is hereby incorporated by reference in its entirety.

BACKGROUND

1. Technical Field

The present disclosure relates to a media processing device that has a reading unit, a media processing system including the media processing device and a terminal device, and a control method of the media processing device.

2. Related Art

Media processing devices (check readers) that have a reading unit (magnetic ink character reading means) and can read information recorded on checks and similar media are known from the literature. See, for example, JP-A-2004-206362.

This type of media processing device is generally connected to a host computer on which a device driver for controlling the media processing device is installed, and reads information with the reading unit under the control of the host computer. If reading information with the reading unit of the media processing device could be controlled by methods other than control by the host computer, the media processing device could be controlled by a greater diversity of methods, thereby improving the value of the media processing device as a useful product.

SUMMARY

The present invention provides a new method of controlling a media processing device that has a reading unit.

One aspect of the invention is a media processing device including: a reading unit that reads information recorded on a medium; a communication unit that sends and receives data in markup language; and a control unit that controls the reading unit to read information recorded on the medium based on control data in markup language received by the communication unit, and receives the read result of the reading unit.

By sending markup language control data from a web browser to a media processing device, this aspect of the invention can control a reading unit to read information recorded on the medium, and the web browser can acquire the result of reading by the reading unit after sending the control data. More specifically, the invention enables controlling a media processing device with a reading unit by means of a new control method using a device that can output markup language, such as a device having an installed web browser, instead of controlling the media processing device from a host computer.

Preferably, the media processing device also has a print unit that prints an image on the media; and the control unit controls the print unit to print based on the control data in markup language received by the communication unit.

This configuration enables operating a print unit and printing images on media based on control data written in markup language.

A media processing device according to another aspect of the invention preferably also has a storage unit that stores a list including a control command related to control of the reading unit; and the control unit outputs a control command contained in the list stored in the storage unit to the reading unit and controls the reading unit based on the markup language control data received by the communication unit.

This configuration enables a control unit to control a reading unit based on control data even when a device driver for the reading unit is not installed on the media processing device, and the control unit cannot use the functions of a device driver for the reading unit.

Further preferably, the control unit acquires model information of the reading unit, outputs a control command contained in the list corresponding to the acquired model information to the reading unit, and controls the reading unit.

In this configuration, the control unit can control the reading unit appropriately to the model of the reading unit.

In a media processing device according to another aspect of the invention, the control command contained in the list is a response request command that queries if the reading unit is in a state enabling reading information recorded on the media; and the control unit outputs the response request command to the reading unit, and queries whether or not the reading unit can read the information recorded on the medium, based on the control data received by the communication unit.

In this aspect of the invention, the control unit can control the reading unit to read information when the reading unit is able to read information recorded on the medium.

Another aspect of the invention is a media processing system including: a terminal that sends and receives control data in markup language; and a media processing device that includes a reading unit that reads information recorded on a medium, a communication unit that receives the control data in markup language sent by the terminal, and a control unit that controls the reading unit to read information recorded on the medium based on control data in markup language received by the communication unit, and receives data based on the read result of the reading unit.

By sending markup language control data from a web browser to a media processing device, this aspect of the invention can control a reading unit to read information recorded on the medium, and the web browser can acquire the result of reading by the reading unit after sending the control data. More specifically, the invention enables controlling a media processing device with a reading unit by means of a new control method using a device that can output markup language, such as a device having an installed web browser, instead of controlling the media processing device from a host computer.

Preferably, the media processing device also has a storage unit that stores a list including a control command related to control of the reading unit; and the control unit outputs the control command contained in the list stored in the storage unit to the reading unit and controls the reading unit based on the markup language control data received by the communication unit.

This configuration enables a control unit to control a reading unit based on control data even when a device driver for the reading unit is not installed on the media processing device, and the control unit cannot use the functions of a device driver for the reading unit.

Another aspect of the invention is a control method of a media processing device, including: receiving control data in markup language; converting the control data received in the markup language to control commands to control a reading unit; sending the control commands to a reading unit to read data recorded on the medium; and converting the read data to markup language and outputting the resulting markup language control data.

By sending markup language control data from a web browser to a media processing device, this aspect of the invention can control a reading unit to read information recorded on the medium, and the web browser can acquire the result of reading by the reading unit after sending the control data. More specifically, the invention enables controlling a media processing device with a reading unit by means of a new control method using a device that can output markup language, such as a device having an installed web browser, instead of controlling the media processing device from a host computer.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1A:
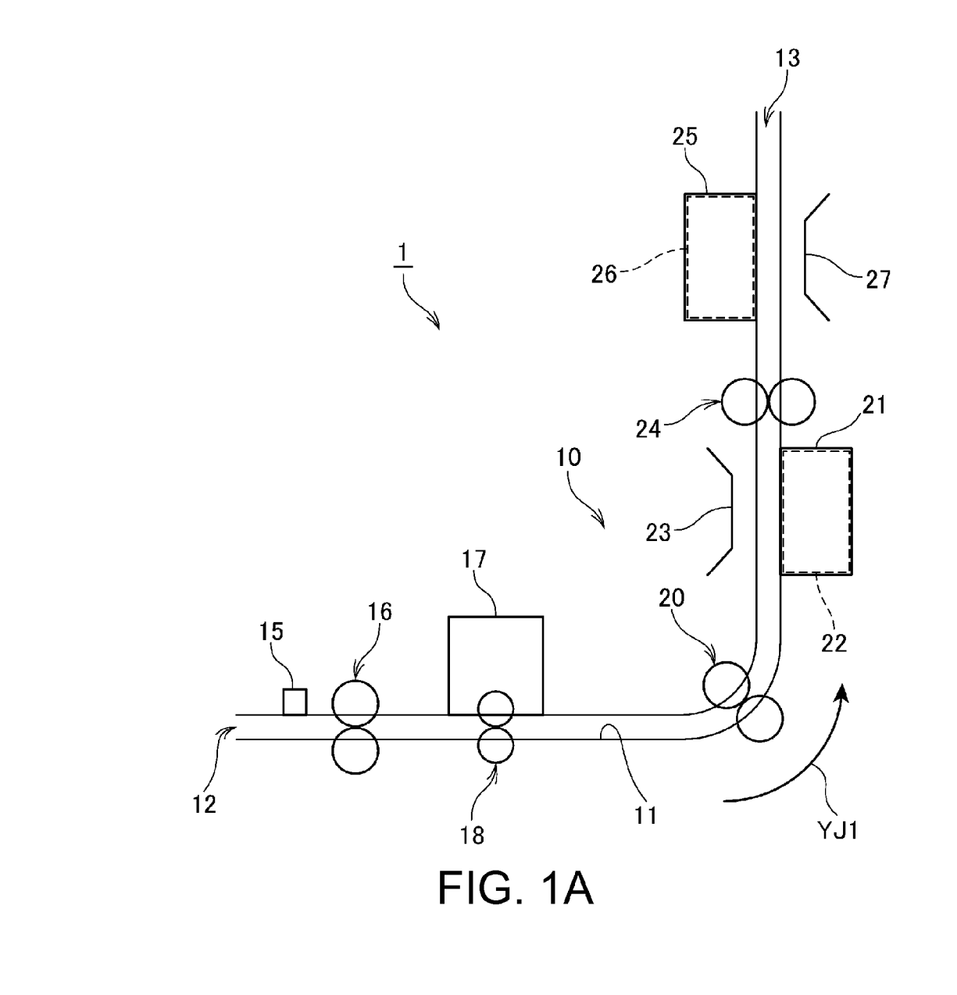
FIG. 1A illustrates the internal configuration of a media processing device according to the invention.
Figure 1B:
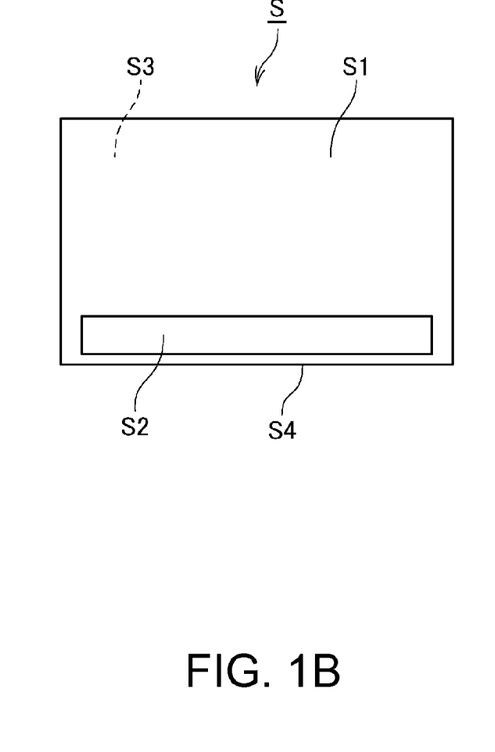
FIG. 1B illustrates a check.

FIG. 1A illustrates the internal configuration of the media processing device 1 according to this embodiment as seen from the side. FIG. 1B schematically illustrates an example of a check.

The media processing device 1 has functions for reading magnetic ink characters S2 (information) recorded on the face S1 of a check S (media), and printing images on the face S1 and the back S3 of the check S.

As shown in FIG. 1B, magnetic ink characters S2 are recorded along the bottom edge S4 in an area near the bottom edge S4 on the face S1 of the check S. Selected information related to the check S, such as the payee, the date issued, and the check amount, may be printed by the media processing device 1 above the magnetic ink characters S2 on the face S1 of the check S. Endorsement information, such as an authorization number, date, and amount, are printed by the media processing device 1 on the back S3 of the check S.

As shown in FIG. 1A, the media processing device 1 has a media processing unit 10.

The media processing unit 10 has a conveyance path 11 that is basically L-shaped when seen from the side, extending to the back of the device and then curving up. A media entrance 12 from which checks S are inserted is formed at one end of the conveyance path 11, and a media exit 13 from which the checks S are discharged after processing is completed is formed at the other end. After being inserted to the media entrance 12, the check S to be processed in the media processing device 1 is conveyed from the media entrance 12 in the conveyance direction YJ1, and then discharged from the media exit 13.

An insertion detection sensor 15 that detects insertion of a check S through the media entrance 12 is disposed to the conveyance path 11 near the media entrance 12.

A paper feed roller 16 that feeds the check S inserted to the media entrance 12 to the conveyance path 11 is disposed downstream in the conveyance direction YJ1 from the insertion detection sensor 15.

A MICR (magnetic ink character recognition) reader 17 (reading unit) that reads the magnetic ink characters S2 recorded on the face S1 of the check S is disposed downstream in the conveyance direction YJ1 from the paper feed roller 16. The MICR reader 17 includes a MICR reader conveyance roller 18 that conveys the check S at a specific speed while reading the magnetic ink characters S2, and conveys and discharges the check S in the conveyance direction YJ1 from the MICR reader 17 after reading is completed.

A first conveyance roller 20 that conveys the check S in the conveyance direction YJ1 through the conveyance path 11 is disposed downstream in the conveyance direction YJ1 from the MICR reader 17.

A first printer unit (print unit) is disposed downstream in the conveyance direction YJ1 from the first conveyance roller 20. The first printer unit includes a first carriage 21 that can scan in a direction perpendicular to the conveyance direction YJ1, and a first SIDM (serial impact dot matrix) printhead 22 carried on the first carriage 21. The first SIDM printhead 22 is a printhead that prints images on the back S3 of the check S by striking an ink ribbon with recording wires and transferring ink from the ink ribbon to the back S3 of the check S. A first platen 23 is disposed to a position opposite the first SIDM printhead 22.

A second conveyance roller 24 that conveys the check S in the conveyance direction YJ1 is disposed downstream in the conveyance direction YJ1 from the first SIDM printhead 22.

A second printer unit (print unit) is disposed downstream in the conveyance direction YJ1 from the second conveyance roller 24. The second printer unit includes a second carriage 25 that can scan in a direction perpendicular to the conveyance direction YJ1, and a second SIDM printhead 26 carried on the second carriage 25. The second SIDM printhead 26 is a printhead that prints images on the face S1 of the check S. A second platen 27 is disposed to a position opposite the second SIDM printhead 26.

Figure 2:
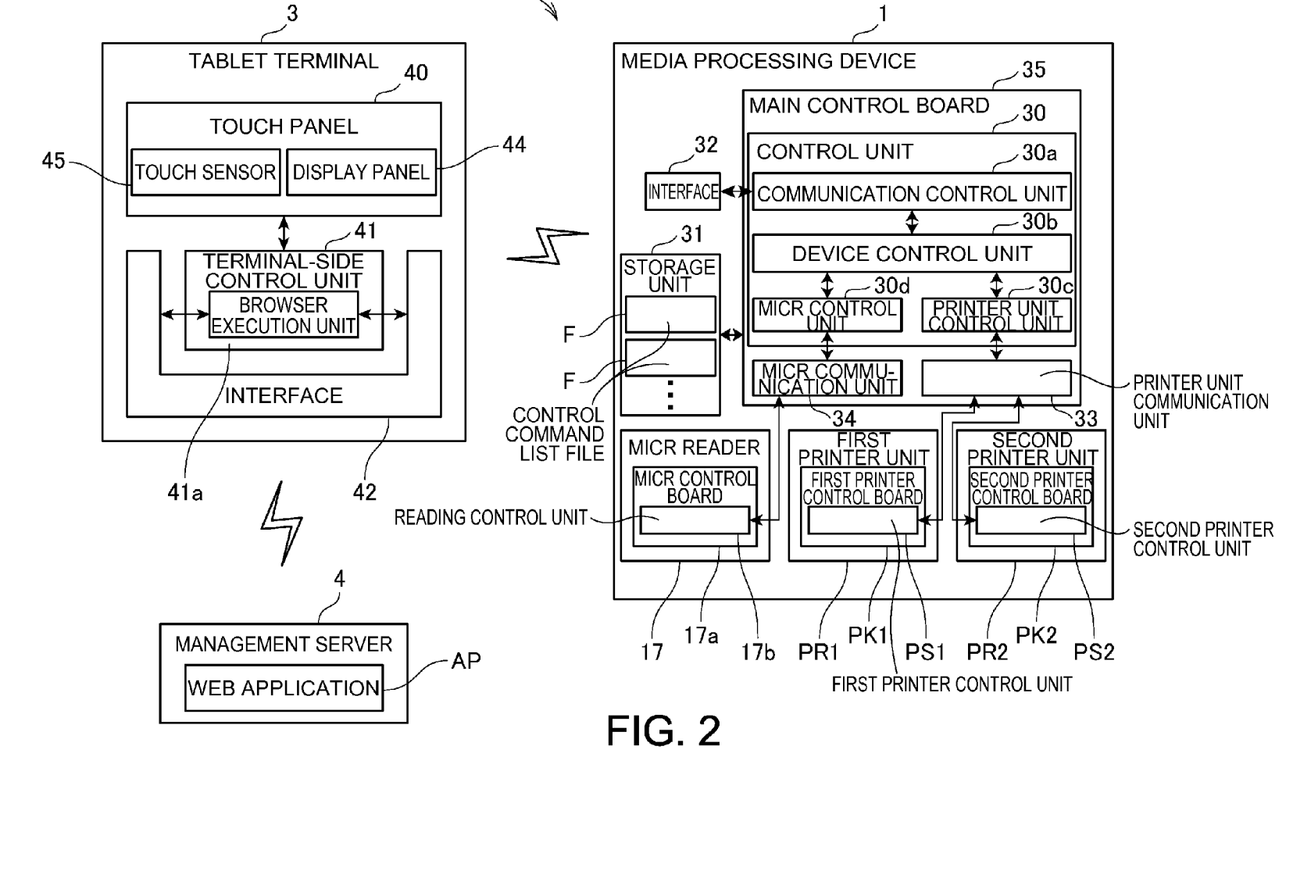
FIG. 2 is a block diagram showing the functional configuration of devices in a media processing system.

FIG. 2 is a block diagram showing the functional configuration of a media processing system 2 according to the invention. As shown in FIG. 2, the media processing system 2 includes a media processing device 1, a tablet terminal 3 (terminal device), and a management server 4.

The media processing device 1 and tablet terminal 3 are configured to communicate wirelessly through a LAN or other network, and the tablet terminal 3 and management server 4 are likewise configured to communicate wirelessly through a LAN or other network. The method of communication between devices is not limited to the foregoing, and any desirable method may be used.

As shown in FIG. 2, the media processing device 1 has a control unit 30, a storage unit 31, an interface 32, a printer unit communication unit 33, a MICR communication unit 34, a first printer unit PR1, a second printer unit PR2, and a MICR reader 17.

The control unit 30 includes a CPU, ROM, RAM, and other peripheral circuits, and controls parts of the media processing device 1. The function blocks of the control unit 30 are further described below. Circuits related to the control unit 30, and other associated component parts, are mounted on the main control board 35.

The storage unit 31 includes nonvolatile memory such as EEPROM or a hard disk drive, and stores data rewritably. A control command list file F for the MICR reader 17 is stored in the storage unit 31. The control command list file F is described below.

The interface 32 communicates with the tablet terminal 3 as controlled by the control unit 30 according to a specific communication standard.

The printer unit communication unit 33 has a communication device such as an interface card disposed to a circuit board, and connects to the first printer unit PR1 and second printer unit PR2 through respective communication cables connected to the circuit board.

The first printer unit PR1 has a first printer control board PK1 as the control board, and a first printer control unit PS1 that controls parts of the first printer unit PR1 is mounted on the first printer control board PK1. The second printer unit PR2 likewise has a second printer control board PK2 as the control board, and a second printer control unit PS2 that controls parts of the second printer unit PR2 is mounted on the second printer control board PK2.

The printer unit communication unit 33 communicates with the first printer control board PK1 of the first printer unit PR1 and the second printer control board PK2 of the second printer unit PR2 according to a specific communication standard as controlled by the control unit 30.

The MICR communication unit 34 has a communication device such as an interface card disposed to a circuit board, and connects to the MICR reader 17 through a communication cable connected to the circuit board. The MICR reader 17 has a MICR control board 17a as a control card, and a reading control unit 17b that controls components of the MICR reader 17 is mounted on this MICR control board 17a. The MICR communication unit 34 communicates with the MICR control board 17a of the MICR reader 17 according to a specific communication standard as controlled by the control unit 30.

More specifically, the MICR communication unit 34 in this embodiment of the invention communicates with the MICR control board 17a using a TCP/IP protocol.

The circuits and associated component parts of the printer unit communication unit 33 and MICR communication unit 34 are mounted on the main control board 35.

The tablet terminal 3 is a tablet computer, has a touch panel 40 on the front surface, and receives different inputs as a result of touching the touch panel 40.

As shown in FIG. 2, the tablet terminal 3 has a touch panel 40, a terminal-side control unit 41, and an interface 42.

The touch panel 40 comprises a display panel 44 on the front surface of the tablet terminal 3, and an integrated touch sensor 45 superimposed with the display panel 44.

The display panel 44 may be an LCD panel, an OLED panel, electronic paper, or other suitable display device.

The touch sensor 45 is an electrostatic or pressure-sensitive sensor overlaid with the display panel 44, detects touches made with the user's finger or a pen-like stylus device, and outputs to the terminal-side control unit 41.

The terminal-side control unit 41 includes a CPU, ROM, RAM, and other peripheral circuits, and controls parts of the tablet terminal 3. One function block of the terminal-side control unit 41 is a browser execution unit 41a. The browser execution unit 41a is a function block achieved by running an installed browser program. The browser execution unit 41a functions as a web browser.

The interface 42 communicates with the media processing device 1 and management server 4 according to a specific communication standard as controlled by the terminal-side control unit 41.

The management server 4 functions as a web server that generates and outputs a display file conforming to a specific protocol such as HTTP in response to requests from the browser execution unit 41a of the tablet terminal 3 used as a client device.

An installed web application AP runs on the management server 4. Using a function of the web application AP, the management server 4 sends an appropriate display file to the browser execution unit 41a when a specific URL is accessed from the browser execution unit 41a of the tablet terminal 3. Using a function of the web application AP, the management server 4 also executes a specific computing process in response to a request from the browser execution unit 41a of the tablet terminal 3, and sends data representing the result of the process to the browser execution unit 41a.

The communication control unit 30a, device control unit 30b, printer unit control unit 30c, and MICR control unit 30d that are function blocks of the control unit 30 are described next.

The communication control unit 30a has functions for opening a connection according to a specific communication protocol such as WebSocket with the browser execution unit 41a of the tablet terminal 3, and establishing a communication link with the browser execution unit 41a. The communication control unit 30a also has a function for sending and receiving data with the browser execution unit 41a through the established communication link. More specifically, when control data (described below) is received from the browser execution unit 41a of the tablet terminal 3, the communication control unit 30a outputs the received control data D1 to the device control unit 30b.

When control data D1 is input from the communication control unit 30a, the device control unit 30b outputs the print control data D2 (described below) contained in the control data D1 to the printer unit control unit 30c.

When control data D1 is input from the communication control unit 30a, the device control unit 30b also outputs the read control data D3 (described below) contained in the control data D1 to the MICR control unit 30d.

When data is input from the printer unit control unit 30c or MICR control unit 30d, the device control unit 30b outputs the input data to the communication control unit 30a.

When data is input from the device control unit 30b, the communication control unit 30a sends the input data through the established communication link to the browser execution unit 41a of the tablet terminal 3.

By centrally controlling the printer unit control unit 30c and MICR control unit 30d, the device control unit 30b coordinates operation of the MICR reader 17, the first printer unit PR1, and the second printer unit PR2. As a result, reading the magnetic ink characters S2 with the MICR reader 17 and printing images with the printer units on a check S can be completed in a single continuous process.

The printer unit control unit 30c executes the processes described below by the function of an installed printer driver. More specifically, when print control data D2 from the device control unit 30b is input, the printer unit control unit 30c converts the print control data D2 to appropriate print control commands conforming to the command languages of the first printer unit PR1 and second printer unit PR2. Next, the printer unit control unit 30c outputs the print control commands at a specific timing to the first printer unit PR1 or second printer unit PR2, and controls the print units thereof.

When status data or similar data is input from the first printer unit PR1 or second printer unit PR2, the printer unit control unit 30c converts the input data to data that the browser execution unit 41a can process (data the web application AP can process). The printer unit control unit 30c then outputs the converted data to the device control unit 30b.

The MICR control unit 30*d* executes the following processes.

In this embodiment of the invention a device driver for controlling the MICR reader 17 is not installed on the media processing device 1. As described further below, the media processing device 1 according to this embodiment can control the MICR reader 17 appropriately to the model and read the magnetic ink characters S2 recorded on checks S without using the functions of a device driver for controlling the MICR reader 17.

When read control data D3 from the device control unit 30*b* is input, the MICR control unit 30*d* executes the process described below and controls the MICR reader 17 based on the read control data D3.

When data such as data representing the result of reading the magnetic ink characters S2 is input from the MICR reader 17, the MICR control unit 30*d* converts the data to data that the browser execution unit 41*a* can process (data that the web application AP can process). Next, the MICR control unit 30*d* outputs the converted data to the device control unit 30*b*.

The web application AP run by the web browser of the tablet terminal 3 has a function for generating an object that executes a specific process on the media processing device 1. An object as used in this embodiment of the invention is an instance in an object-oriented programming language, and means a software function block defined by a set of methods and data. However, an object is not limited to an instance in an object-oriented programming language, and may be a software construction that runs a specific process on a web browser.

Furthermore, in this embodiment the communication control unit 30*a*, device control unit 30*b*, printer unit control unit 30*c*, and MICR control unit 30*d* described above are objects instantiated by the web application AP run by the web browser of the tablet terminal 3.

The operation of the tablet terminal 3 and media processing device 1 when reading magnetic ink characters S2 and printing images on a check S is described next.

Figure 3A:
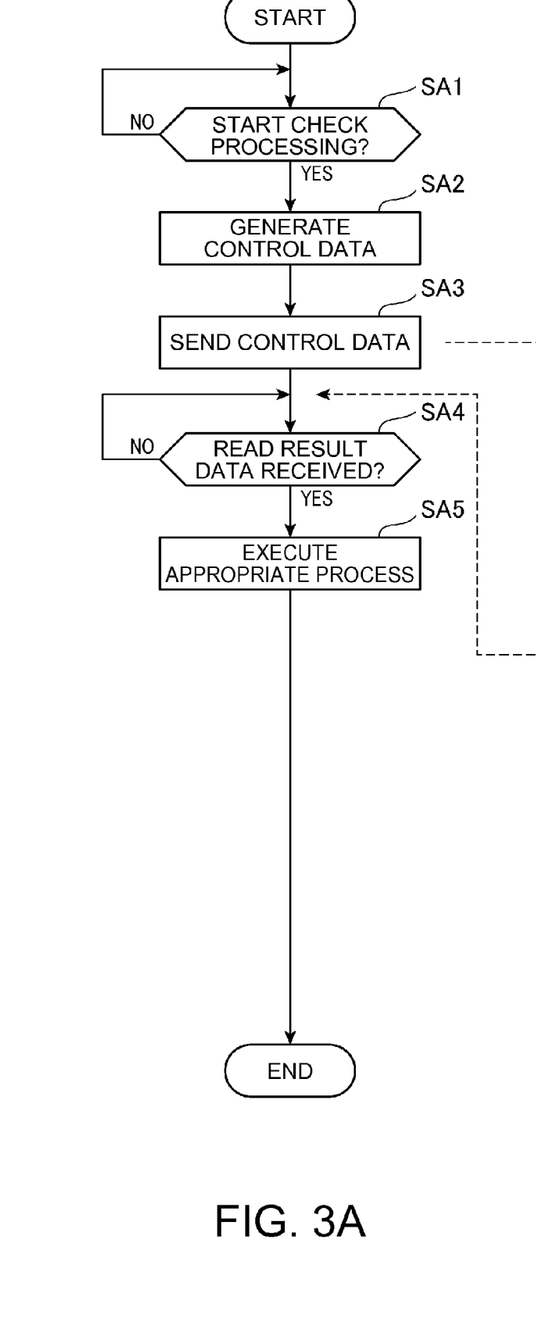
FIGS. 3A and 3B are flow charts of the operation of a tablet terminal and a media processing device respectively.
Figure 3B:
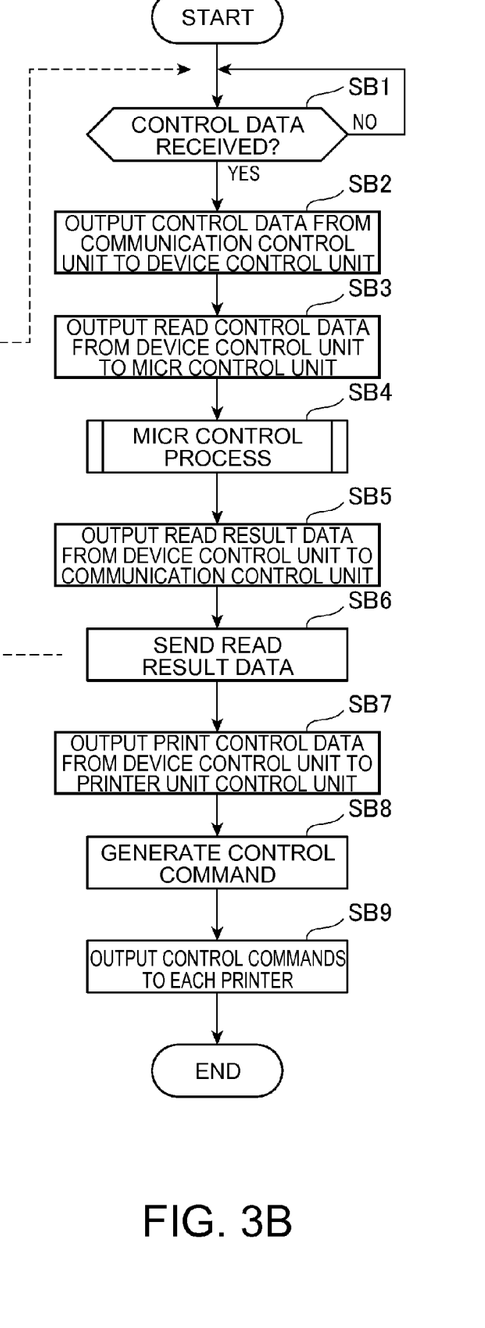

FIG. 3 is a flow chart of the operation of the tablet terminal 3 and media processing device 1 when processing a check S, column (A) showing the operation of the tablet terminal 3, and column (B) showing the operation of the media processing device 1.

When the operation shown in FIG. 3 starts, a communication link between the browser execution unit 41*a* and the communication control unit 30*a* has been established, and data can be sent and received between these function blocks. When the operation shown in FIG. 3 starts, a check S has also already been set in the media processing device 1 for processing. Furthermore, control of conveying the check S when reading the magnetic ink characters S2 from the check S, and conveying the check S when printing images on the check S, is not described in detail below, but it will be obvious that a conveyance mechanism not shown is controlled and the check S is conveyed in conjunction with reading the magnetic ink characters S2 and printing images.

As shown in FIG. 3 (A), the browser execution unit 41*a* of the tablet terminal 3 determines whether or not to start processing the check S (step SA1).

For example, using a function of the web application AP on the management server 4, the browser execution unit 41*a* displays a user interface such as described below in a browser window. More specifically, the user interface enables starting processing a check S, and enables inputting information required to start the process. The information required to start the process includes, for example, information related to the images to be printed on the face S1 and back S3 of the check S. When the required information is input and starting processing the check S is commanded through the user interface in step SA1, the browser execution unit 41*a* decides to start processing the check S. The browser execution unit 41*a* also decides to start processing the check S when data instructing starting processing the check S is received from the management server 4 or other external device that can communicate.

If processing a check S starts (step SA1 returns YES), the browser execution unit 41*a* generates control data D1 including the read control data D3 and print control data D2 using a function of the web application AP (step SA2).

The read control data D3 is data containing information instructing reading the magnetic ink characters S2 from the check S with the MICR reader 17. In this embodiment of the invention, the read control data D3 is an XML document written in an XML-related markup language. Information instructing reading the magnetic ink characters S2 from the check S with the MICR reader 17 is written in the read control data D3 in XML format.

The print control data D2 is data containing information related to the images to be printed by the first printer unit PR1 and second printer unit PR2. In this embodiment of the invention, the print control data D2 is an XML document. Information related to the images to be printed by each printer unit is written in the print control data D2 in XML format.

After generating the control data D1, the browser execution unit 41*a* sends the control data D1 through the established communication link to the communication control unit 30*a* of the media processing device 1 (step SA3). Next, the browser execution unit 41*a* checks if the read result data D4 was received (step SA4). Operation from step SA4 is described below.

As shown in FIG. 3 (B), the communication control unit 30*a* of the media processing device 1 checks if control data D1 was received (step SB1).

If the control data D1 was received (step SB1 returns YES), the communication control unit 30*a* outputs the received control data D1 to the device control unit 30*b* (step SB2).

Next, the device control unit 30*b* outputs the read control data D3 contained in the control data D1 to the MICR control unit 30*d* (step SB3).

When the read control data D3 is input, the MICR control unit 30*d* then executes the MICR control process (step SB4).

Figure 4:
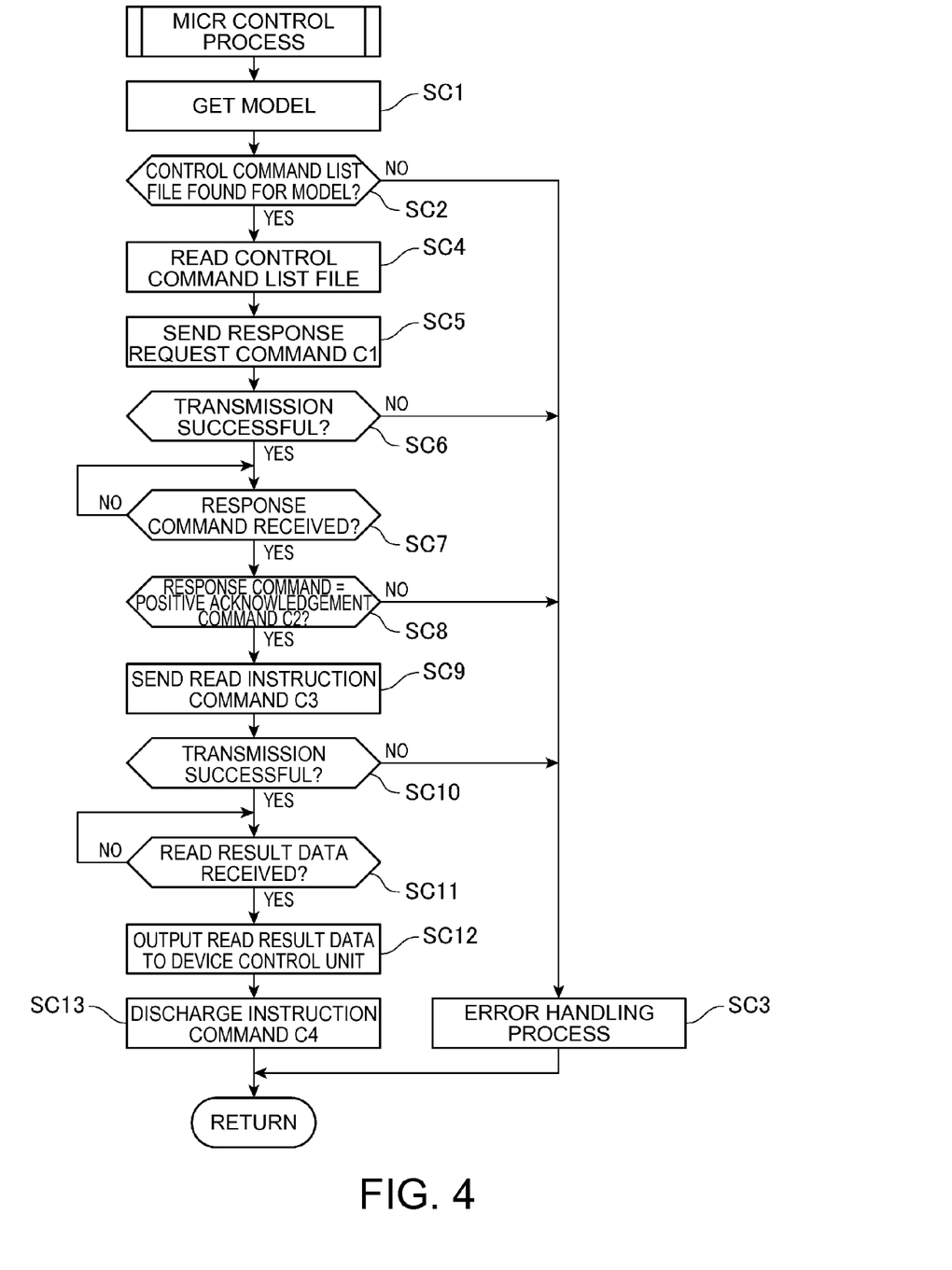
FIG. 4 is a flowchart showing the MICR control process in detail.

FIG. 4 is a flowchart showing the MICR control process in detail.

As described above, the MICR control unit 30*d* controls the MICR reader 17 and reads the magnetic ink characters S2 recorded on the check S by executing the process described below without using an installed device driver for the MICR reader 17.

When the operation described in the flow chart in FIG. 4 starts, a TCP connection has already been established between the MICR communication unit 34 and the reading control unit 17*b*, and the MICR control unit 30*d* and reading control unit 17*b* can communicate using the TCP/IP protocol. This configuration requires a normal communication connection between the main control board 35 and the MICR control board 17*a*.

As shown in FIG. 4, the MICR control unit 30*d* first gets the model of MICR reader 17 in the MICR control process (step SC1).

In this embodiment of the invention, any of plural different models of MICR reader may be used in the media processing device 1. Data identifying the model of MICR reader 17 installed in the media processing device 1 is stored when the media processing device 1 is manufactured in a storage area that can be read by the MICR control unit 30*d*. In step SC1, the MICR control unit 30d reads this data to get the model of the MICR reader 17. The method of acquiring the model information is not limited to the foregoing. For example, a configuration in which the model data is included in the print control data D2 and the model is acquired from the print control data D2 is conceivable. A configuration that acquires the model information by communicating with the MICR control unit 30d is also conceivable.

Next, the MICR control unit 30d accesses the storage unit 31, and determines whether or not a control command list file F corresponding to the model acquired in step SC1 is stored (step SC2).

A control command list file F is stored in the storage unit 31 for each model of MICR reader that can be installed in the media processing device 1. The file name of each control command list file F is constructed in a standard format including the name of the corresponding model. In step SC2, the MICR control unit 30d determines whether or not a control command list file F corresponding to the model acquired in step SC1 is stored in the storage unit 31 based on the file names of the control command list files F.

If a control command list file F corresponding to the model acquired in step SC1 is not stored in the storage unit 31 (step SC2 returns NO), the MICR control unit 30d runs an error handling process (step SC3). This is because, as described below, the MICR control unit 30d controls the MICR reader 17 using an control command list file F, and control is not possible if a control command list file F corresponding to the installed model is not stored.

In the error handling process of step SC3, the MICR control unit 30d at least stops control of the MICR reader 17 and stops processing by the MICR reader 17. The error handling process may also include reporting that an error occurred by displaying information on a display unit not shown or outputting audio by an audio output unit not shown, or reporting that an error occurred by sending specific data to the tablet terminal 3 through the device control unit 30b and communication control unit 30a.

If a control command list file F corresponding to the model acquired in step SC1 is stored in the storage unit 31 (step SC2 returns YES), the MICR control unit 30d reads the control command list file F (step SC4).

Figure 5:
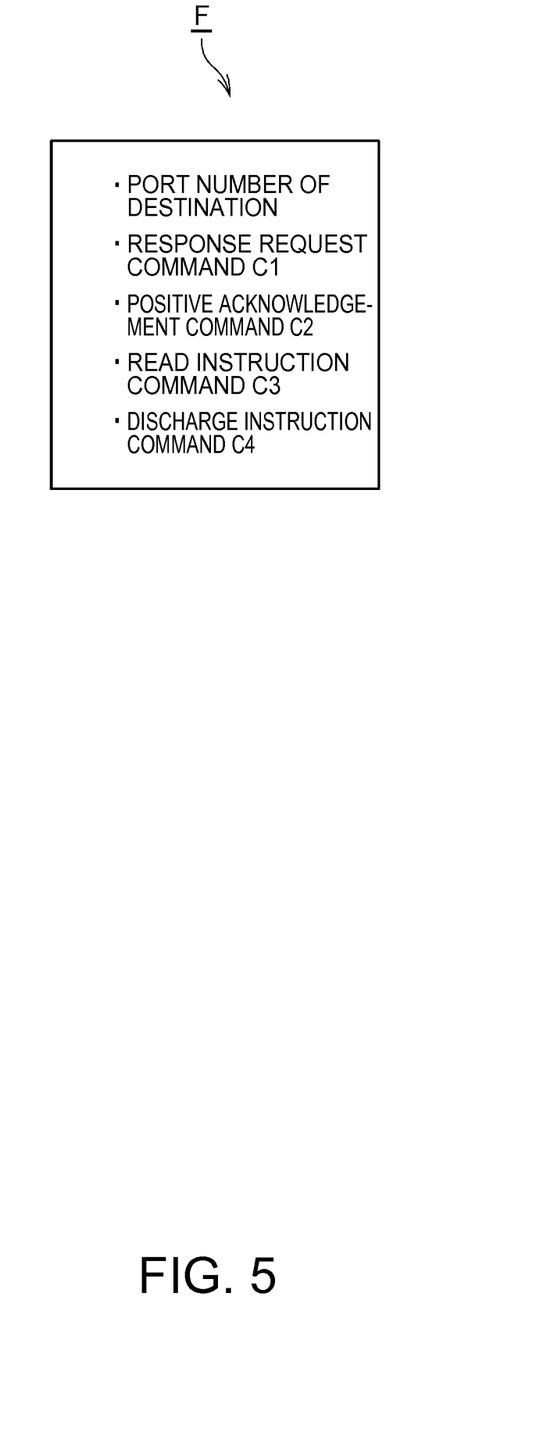
FIG. 5 illustrates the content of a control command list file.

FIG. 5 illustrates the content of the control command list file F in a format appropriate to this description.

The control command list file F is a text file and includes (stores) at least the information described below.

Specifically, the TCP port number for sending data to the reading control unit 17b of the MICR reader 17 is written in the control command list file F.

Codes for a response request command C1, a positive acknowledgement command C2, a read instruction command C3, and a discharge instruction command C4 are also written in the control command list file F. The command codes are written in the control command list file F in a format (such as binary) that the reading control unit 17b of the MICR reader 17 can process. More specifically, each of the commands written in the control command list file F conforms to the command language of the MICR reader 17. Therefore, by outputting the code of any command (except for the positive acknowledgement command C2 as described below) written in the control command list file F as the control command to the reading control unit 17b of the MICR reader 17, the MICR reader 17 can be operated based on the output control command.

Note that of these commands, the response request command C1, read instruction command C3, and discharge instruction command C4 are commands that the MICR control unit 30d sends to the reading control unit 17b, and the positive acknowledgement command C2 is a command the reading control unit 17b sends to the MICR control unit 30d.

The content of each command written in the control command list file F is described below.

After the process of step SC4, the MICR control unit 30d sends the response request command C1 written in the control command list file F through the MICR communication unit 34 to the reading control unit 17b of the MICR reader 17 (step SC5). The MICR control unit 30d sends the response request command C1 to the port of the port number written in the control command list file F. This is also applies when sending other commands in the steps described below.

The response request command C1 is a command that queries whether or not the MICR reader 17 can read the magnetic ink characters S2 recorded on the check S. After sending the response request command C1, the MICR control unit 30d determines whether or not response request command C1 transmission was successful (step SC6). For example, if a transmission-related error occurred, command transmission could have failed. If sending the response request command C1 failed (step SC6 returns NO), the MICR control unit 30d goes to step SC3 and executes the error handling process.

If sending the response request command C1 was successful (step SC6 returns YES), the MICR control unit 30d checks whether or not a response to the response request command C1 was received (step SC7). Note that while not shown in the figures, when receiving a response fails, the MICR control unit 30d goes to step SC3 and executes the error handling process. For example, the MICR control unit 30d could determine that receiving the response command failed if a response is not received by the time a specific time passes after the response request command C1 is sent due to a transmission error, or all data in the response command could not be received due to corruption of the response command.

When the response command to the response request command C1 is received (step SC7 returns YES), the MICR control unit 30d reads the positive acknowledgement command C2 written in the control command list file F, and determines if the received response command is the positive acknowledgement command C2 (step SC8).

The positive acknowledgement command C2 is a response command indicating that the MICR reader 17 is in a state enabling running the process for reading the magnetic ink characters S2. Therefore, the MICR reader 17 can run the magnetic ink character S2 reading process if the received response command is the positive acknowledgement command C2, and the MICR reader 17 cannot execute the magnetic ink character S2 reading process if the received response command is a command other than the positive acknowledgement command C2.

The reading control unit 17b of the MICR reader 17 also has a function for determining based on detection output from different sensors, for example, whether or not it can run the reading process. If the response request command C1 from the MICR control unit 30d is received, the reading control unit 17b uses this function to determine whether or not the read process can be executed, outputs the positive acknowledgement command C2 if the process can be executed, and outputs a different command if the process cannot be executed.

When the response command received in step SC8 is not the positive acknowledgement command C2, in other words, if the MICR reader 17 cannot execute the magnetic ink character S2 reading process (step SC8 returns NO), the MICR control unit 30*d* goes to step SC3 and executes the error handling process.

However, if the received response command is the positive acknowledgement command C2, in other words, the MICR reader 17 can execute the magnetic ink character S2 reading process (step SC8 returns YES), the MICR control unit 30*d* goes to step SC9.

In step SC9, the MICR control unit 30*d* reads the control command list file F and sends the read instruction command C3 written in the control command list file F through the MICR communication unit 34 to the reading control unit 17*b* of the MICR reader 17 (step SC9).

The read instruction command C3 is a command instructing reading the magnetic ink characters S2 by the MICR reader 17.

When the read instruction command C3 is received, the reading control unit 17*b* of the MICR reader 17 controls the components of the MICR reader 17 based on the read instruction command C3 to read the magnetic ink characters S2, and then sends data indicating the read result to the MICR control unit 30*d*. Note that while reading the magnetic ink characters S2, the device control unit 30*b*, the MICR control unit 30*d*, and the reading control unit 17*b* cooperatively control the MICR reader conveyance roller 18 and other conveyance mechanisms to convey the check S.

Reading the magnetic ink characters S2 is described below. The MICR reader 17 has a magnetic head and a signal processing circuit. As controlled by the reading control unit 17*b*, the magnetic head detects the EMF produced by change in the magnetic field created by the magnetic ink characters S2 passing the read position, and outputs the result as the detection signal to the signal processing circuit. The signal processing circuit includes an amplifier, a noise reduction filter, and an A/D converter, amplifies and shapes the detection signal input from the magnetic head, and outputs the result as data to the reading control unit 17*b*. Based on the data input from the signal processing circuit, the reading control unit 17*b* generates data related to the read result, and sends the data related to the read result through the MICR communication unit 34 to the MICR control unit 30*d*.

After transmission of the read instruction command C3, the MICR control unit 30*d* determines whether or not command transmission was successful (step SC10), and if transmission failed (step SC10 returns NO), goes to step SC3 and executes the error handling process.

If transmission of the read instruction command C3 was successful (step SC10 returns YES), the MICR control unit 30*d* monitors whether or not data related to the read result was received (step SC11). Note that while not shown in the figure, when receiving data related to the read result fails, the MICR control unit 30*d* goes to step SC3 and executes the error handling process.

If the data related to the read result is received (step SC11 yes, the MICR control unit 30*d* generates the read result data D4 of an XML document written in an XML-related markup language based on the received data related to the read result, and outputs to the device control unit 30*b* (step SC12).

Next, the MICR control unit 30*d* reads the control command list file F, and sends the discharge instruction command C4 written in the control command list file F through the MICR communication unit 34 to the reading control unit 17*b* of the MICR reader 17 (step SC13).

The discharge instruction command C4 is a command instructing conveying check S in the conveyance direction YJ1 and discharging the check S from the MICR reader 17.

When the discharge instruction command C4 is received, the reading control unit 17*b* controls the MICR reader conveyance roller 18 and other conveyance mechanisms to convey the check S in the conveyance direction YJ1 and discharge the check S from the MICR reader 17.

As shown in FIG. 3 (B), after the MICR control process of step SB4, the device control unit 30*b* outputs the read result data D4 input from the MICR control unit 30*d* by the process of step SC12 in the flow chart in FIG. 4 to the communication control unit 30*a* (step SB5).

Next, the communication control unit 30*a* sends the read result data D4 input from the device control unit 30*b* to the browser execution unit 41*a* of the tablet terminal 3 (step SB6).

As shown in FIG. 3 (A), in step SA4, the browser execution unit 41*a* of the tablet terminal 3 monitors whether or not the read result data D4 was received. If the read result data D4 was received (step SA4 returns YES), the browser execution unit 41*a* executes a specific process, such as character recognition, based on the received read result data D4 (step SA5). The read result data D4 or other data analysis results could also conceivably be sent to the server or other device that manages the results of reading the magnetic ink characters S2.

As shown in FIG. 3 (B), after sending the read result data D4, the device control unit 30*b* outputs the print control data D2 contained in the control data D1 received from the browser execution unit 41*a* of the tablet terminal 3 in step SB1 to the printer unit control unit 30*c* (step SB7).

Based on the input print control data D2, the printer unit control unit 30*c* generates control commands for controlling the first printer unit PR1 and second printer unit PR2 (step SB8). The printer unit control unit 30*c* has a function for generating control commands in the command languages of the first printer unit PR1 and second printer unit PR2 based on the print control data D2, which is an XML document.

Next, the printer unit control unit 30*c* sends the generated control commands through the printer unit communication unit 33 to the first printer unit PR1 and second printer unit PR2 (step SB9). The first printer unit PR1 prints an image on the back S3 of the check S based on the input control commands, and the second printer unit PR2 prints an image on the face 51 of the check S based on the input control commands.

As described above, a control command list file F is stored for each model of MICR reader in the storage unit 31 of the MICR reader 17, and the commands required to execute a process related to reading the magnetic ink characters S2 is written in the control command list file F. This configuration thus enables the MICR control unit 30*d* to control the MICR reader 17 using a control command list file F without relying on the function of a device driver for controlling the MICR reader 17.

As described above, the control unit 30 of the media processing device 1 in this embodiment of the invention controls a MICR reader 17 and reads the magnetic ink characters S2 recorded on the check S based on the control data D1 in a markup language received from a web browser running on a tablet terminal 3, and sends read result data D4 based on the result of reading by the MICR reader 17 to the web browser running on the tablet terminal 3 (causes the web browser to receive the read result data D4).

By sending control data D1 from a web browser to the media processing device 1, this configuration enables controlling the MICR reader 17 to read magnetic ink characters S2 recorded on a check S. In addition, the web browser can also acquire the result of reading by the MICR reader 17 after sending the control data D1. More specifically, control of a media processing device 1 having an MICR reader 17 is possible by a new method that controls an external device using a web browser instead of relying on control by a host computer.

In this embodiment of the invention the control unit 30 controls and coordinates the operation of the MICR reader 17, the first printer unit PR1, and the second printer unit PR2 based on the control data D1 received from the web browser.

Based on control data received from a web browser, this configuration enables cooperatively operating a MICR reader 17, first printer unit PR1, and second printer unit PR2 to read magnetic ink characters S2 recorded on a check S and to record images on the face S1 and back S3 of the check S.

In this embodiment of the invention, a control command list files F in which a list of control commands related to controlling a particular MICR reader 17 are written (stored) is stored in the storage unit 31 of the media processing device 1. Based on the control data D1, the MICR control unit 30*d* of the control unit 30 controls the MICR reader 17 by outputting the control commands written in the control command list file F stored in the storage unit 31 to the MICR reader 17.

This configuration enables the MICR control unit 30*d* to control the MICR reader 17 based on control data even when a device driver for the MICR reader 17 is not installed in the media processing device 1, and the MICR control unit 30*d* of the control unit 30 cannot use functions of the device driver of the MICR reader 17.

In this embodiment of the invention a control command list file F storing a list of control commands for the model of the installed MICR reader is stored, and the MICR control unit 30*d* of the control unit 30 controls the MICR reader 17 by getting the model of the MICR reader 17, and sending (outputting) the control commands written in the control command list file F corresponding to the acquired model to the MICR reader 17.

This configuration enables the MICR control unit 30*d* of the control unit 30 to control the MICR reader appropriately according to the model of MICR reader.

In this embodiment of the invention a response request command C1 is written in the control command list file F. To control the MICR reader 17 based on the control data D1, the MICR control unit 30*d* of the control unit 30 sends (outputs) the response request command C1 written in the control command list file F to the MICR reader 17, and then sends the read instruction command C3 and discharge instruction command C4 when a positive acknowledgement command C2 is received from the MICR reader 17.

Thus comprised, when the MICR reader 17 can read the magnetic ink characters S2 recorded on the check S, the MICR control unit 30*d* of the control unit 30 can control the MICR reader 17 to read the information in the magnetic ink characters S2.

The foregoing embodiment is one example of the present invention, and can be modified and applied as desired within the scope of the accompanying claims.

For example, the foregoing embodiment describes a configuration in which the web application AP runs on the management server 4, but a configuration in which the web application AP is installed on the media processing device 1, and the web application AP runs on the media processing device 1, is also conceivable. In this event, the media processing device 1 functions as a web server that generates and outputs a display file conforming to HTTP or other specific protocol according the requests from the browser execution unit 41*a* of the client tablet terminal 3.

The foregoing embodiment describes controlling a device through the web browser of a tablet terminal 3, but the invention is not so limited and controlling devices is possible using any application that can send and receive XML or other markup language. The control data is also not limited to being written in an XML-related markup language, and other markup languages may be used instead.

The foregoing embodiment also uses the MICR reader 17 as an example of a reading unit, but the reading unit is limited to devices that read magnetically, and could be a scanner or other device that reads optically.

Furthermore, devices other than the MICR reader 17, first printer unit PR1 and second printer unit PR2 may also be disposed to the media processing device 1.

The function blocks shown in FIG. 2 can be desirably achieved by the cooperation of hardware and software, and do not suggest a specific hardware configuration. The functions of the media processing device 1 may also be rendered by a different externally connected device. The media processing device 1 can also execute the processes by running a program stored in an externally connected storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
   a reading unit that reads information recorded on a medium;
   a communication unit that receives control data written in markup language containing instruction information and that sends read data written in markup language based on a read result of the reading unit;
   a storage unit that stores a list including a control command related to control of the reading unit; and
   a control unit that outputs the control command to the reading unit based on the control data, controls the reading unit to read information recorded on the medium based on the control data, receives the read result from the reading unit, generates the read data based on the read result, and sends the read data by the communication unit.

2. The media processing device described in claim 1, further comprising:
   a print unit that prints an image on the media;
   the control unit controlling the print unit to print based on the control data in markup language received by the communication unit.

3. The media processing device described in claim 1, wherein:
   the control unit acquires model information of the reading unit, the control command contained in the list corresponding to the acquired model information.

4. The media processing device described in claim 1, wherein:
   the control command contained in the list is a response request command that queries if the reading unit is in a state enabling reading information recorded on the media; and
   the control unit outputs the response request command to the reading unit, and queries whether or not the reading unit can read the information recorded on the medium, based on the control data received by the communication unit.

5. A media processing system comprising:
   a management server that runs a web application;
   a terminal including an interface that sends and receives control data written in markup language, and a browser execution unit that executes a browser program and that accesses the web application; and a media processing device including a reading unit that reads information recorded on a medium,
- a communication unit that receives control data written in markup language containing instruction information sent by the browser execution unit and that sends read data written in markup language based on a read result of the reading unit to the browser execution unit,
- a storage unit that stores a list including a control command related to control of the reading unit, and
- a control unit that outputs the control command to the reading unit based on the control data, controls the reading unit to read information recorded on the medium based on the control data, receives the read result from the reading unit, generates the read data based on the read result, and sends the read data to the browser execution unit by the communication unit.

6. The media processing system described in claim 5, further comprising:
   a print unit that prints an image on the media;
   the control unit controlling the print unit to print based on the control data in markup language received by the communication unit.

7. The media processing system described in claim 5, wherein:
   the control unit acquires model information of the reading unit, the control command contained in the list corresponding to the acquired model information.

8. The media processing system described in claim 5, wherein:
   the control command contained in the list is a response request command that queries if the reading unit is in a state enabling reading information recorded on the media; and
   the control unit outputs the response request command to the reading unit, and queries whether or not the reading unit can read the information recorded on the medium, based on the control data received by the communication unit.

9. A control method of a media processing device, comprising:
   reading information recorded on a medium using a reading unit;
   receiving control data written in markup language containing instruction information;
   sending read data written in markup language based on a read result of the reading unit;
   storing a list including a control command related to control of the reading unit;
   outputting the control command to the reading unit based on the control data;
   controlling the reading unit to read information recorded on the medium based on the control data;
   receiving the read result from the reading unit;
   generating the read data based on the read result; and
   sending the read data.

10. The control method of a media processing device described in claim 9, further comprising:
    sending the control command to a print unit to print on the medium.

11. The control method of a media processing device described in claim 9, further comprising:
    acquiring model information of the reading unit;
    wherein the control command contained in the list corresponds to the acquired model information.

12. The control method of a media processing device described in claim 9, wherein:
    the control command contained in the list is a response request command that queries if the reading unit is in a state enabling reading information recorded on the media;
    the control method further comprising outputting the response request command to the reading unit, and querying whether or not the reading unit can read the information recorded on the medium, based on the received control data.

* * * * *